United States Patent
Schrader et al.

[15] 3,676,555
[45] July 11, 1972

[54] INSECTICIDAL AND ACARICIDAL AMIDO-THIOLPHOSPHORIC ACID ESTERS

[72] Inventors: Gerhard Schrader, Wuppertal-Cronenberg; Walter Lorenz, Wuppertal-Vohwinkel; Gunter Unterstenhofer, Opladen; Ingeborg Hammann, Cologne, all of Germany

[73] Assignee: Farbenfabrikenbayer Aktiengesellschaft, Leverkusen, Germany

[22] Filed: March 13, 1968

[21] Appl. No.: 712,626

Related U.S. Application Data

[62] Division of Ser. No. 468,585, June 30, 1965.

[30] Foreign Application Priority Data

July 2, 1964 Germany..............................F 43328

[52] U.S. Cl.............................................424/220, 260/959
[51] Int. Cl. ........................................................A01n 9/36
[58] Field of Search........................................424/211, 220

[56] References Cited

UNITED STATES PATENTS 3,309,266  3/1967  Magee...................................424/211

Primary Examiner—Albert T. Meyers
Assistant Examiner—Vincent D. Turner
Attorney—Burgess, Dinklage & Sprung

[57] ABSTRACT

Certain amido-thiophosphoric acid esters are disclosed which are useful as insecticides and acaricides.

30 Claims, No Drawings

INSECTICIDAL AND ACARICIDAL AMIDO-THIOLPHOSPHORIC ACID ESTERS

This application is a division of copending application Serial No. 468,585, filed June 30, 1965.

The present invention relates to a particular amido-thiophosphoric acid esters and to compositions containing the same, as well as to the production and use thereof.

It is an object of the present invention to provide particular amido-thiophosphoric acid esters which possess outstanding biocidal, especially insecticidal and acaricidal, properties, as well as a comparatively low toxicity toward warm-blooded animals and a low phytotoxicity, in particular when compared with analogous known compounds.

It is another object of the present invention to provide such acid esters in the form of compositions with carrier vehicles, such as dispersible carrier vehicles, used generally for hygiene control purposes.

It is still another object of the present invention to provide a process for the production of such amido-thiolphosphoric acid esters which is smooth and efficient and which leads to significant yields.

It is a further object of the present invention to provide methods of using the particular amido-thiolphosphoric acid esters of the foregoing type in a new way for combating pests, especially by applying to such pests and their habitat biocidally effective amounts of the particular acid esters of the present invention.

Other and further objects of the present invention will become apparent from a study of the within specification and accompanying examples.

It has been found in accordance with the present invention that the particular amido-thiolphosphoric acid esters of the general formula

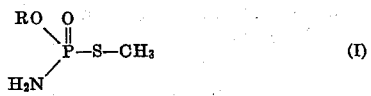

in which R is a linear or branched, preferably lower, alkyl radical, such as a $c_1$–$C_5$ alkyl radical, including methyl, ethyl, n-propyl, isopropyl, n-butyl, isobutyl, sec.-butyl, tert.-butyl, n-amyl, etc. radicals, yet also contemplating higher alkyl radicals up to at least about $C_8$–$C_{12}$, such as octyl, isooctyl, decyl, dodecyl, etc., possess outstanding biocidal, especially insecticidal and acaricidal, properties.

Furthermore, it has been found that the particular compounds of the present invention can be obtained by a smooth and efficient reaction and with good yields, when amido-O-alkylthiophosphoric acid salts of the general formulas

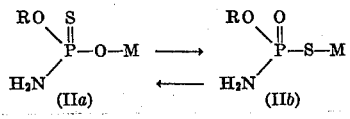

are reacted with methylating agents.

In Formulas IIa and IIb, R has the same meaning as defined for Formula I, and M represents a monovalent metal equivalent, preferably an alkali metal atom such as sodium or potassium.

As can be seen from the above formulas, the amido-O-alkylthiophosphoric acid salts react in the methylation in the thiol form with constant shift of the equilibrium to that form as the reaction proceeds.

Surprisingly, the particular, new compounds of the present invention possess a substantially better insecticidal and acaricidal effectiveness and/or considerably lower toxicity to warm-blooded animals than the closest known compounds of analogous constitution and similar effect. Thus, the instant compounds represent a very important addition to biocidal or pest control technology.

The process according to the present invention is preferably carried out in the presence of inert solvents. Water or polar organic solvents, for example, lower aliphatic alcohols, especially lower alkylols including $C_1$–$C_5$ lower alkanols, such as methanol, ethanol, propanol, butanol, pentanol, and the like, lower aliphatic ketones, especially lower di-alkyl ketones including di-$C_1$–$C_5$ alkyl ketones, such as acetone, methyl ethyl ketone, diethyl ketone, diisopropyl ketone, diisobutyl ketone, and the like, lower aliphatic nitriles, especially lower alkane nitriles including $C_1$–$C_5$ alkyl cyanides, such as acetonitrile, propionitrile, butyronitrile, and the like, and mixtures thereof, have proved to be suitable for this purpose.

It is also advantageous, in order to achieve good yields and to obtain pure products, to carry out the reaction at room temperature or at a slightly elevated temperature (preferably at a temperature substantially between about 20° to 30° C) and, after the starting components have been mixed together, to continue stirring for some time (e.g., about one-half hour), with heating under reflux, if desired.

As methylating agents, methyl halides, such as methyl chloride, methyl bromide, methyl iodide and methyl fluoride, dimethyl sulfate and the corresponding tosylates have been found to be particularly suitable.

In most cases, the compounds of the present invention are obtained in the form of colorless crystals, some of which are water-soluble, even when cooling the reaction mixture to about 0° C, or after the solvent has been distilled off. The instant compounds have a sharp melting point. For further purification, these compounds can be recrystallized from the customary solvents or mixtures of solvents, such as ether, petroleum ether or acetonitrile, thus being easily further purified.

The particular amido-thiolphosphoric acid esters according to the present invention are distinguished by an excellent insecticidal action towards sucking and eating insects, for example, aphids, spider mites, caterpillars and flies. The instant compounds not only possess a very good contact-insecticidal activity, but also an excellent systemic action. Their outstanding effectiveness against resistant spider mites especially must be emphasized. On the other hand, the new compounds according to the present invention exhibit only a comparatively low toxicity against warm-blooded animals, and even possess a correspondingly comparatively low phytotoxicity.

Because of these desirable properties, the compounds of the present invention are usable as pest control agents, particularly in plant protection and also in the field of general hygiene. The low degree of mammalian toxicity as compared with the comparatively high degree of biocidal activity of the instant compounds renders such compounds extremely well suited to handling and manipulation in preparing formulations which may be used manually or by automatic equipment for applying the same to any surface, and especially plants and surrounding soil, whereby to control and minimize the insect problem as it may occur in a given situation.

The new compounds of the instant invention can be used as pesticides either alone or in admixture with solid or liquid carriers or diluents.

The active compounds according to the instant invention can be utilized, if desired, in the form of the usual formulations or compositions with dispersible carrier vehicles such as solutions, emulsions, suspensions, emulsifiable concentrates, spray powders, pastes, soluble powders, dusting agents, granulates, etc. These are prepared in known manner, for instance by extending the active agents with solvents and/or dispersible solid carriers optionally with the use of emulsifying agents and/or dispersing agents, whereby, for example, in the case where water is used as diluent, organic solvents may be added as auxiliary solvents (cf. Agricultural Chemicals, March 1960, pages 35–38). The following may be chiefly considered for use as carrier vehicles or assistants for this purpose: solvents, such as aromatic hydrocarbons (for instance, benzene, toluene, xylene, etc.), halogenated, especially chlorinated, aromatic hydrocarbons (for instance, chlorobenzenes), paraffins (for instances, petroleum fractions), chlorinated aliphatic hydrocarbons (for instance, methylene chloride, etc.), alcohols (for instance, methanol, ethanol, propanol, butanol, etc.), ethers, ether-alcohols (for instance, glycol monomethyl esther, etc.), amines (for instance, ethanolamine, etc.), amides (for instance, dimethyl formamide, etc.), ketones (for instance, acetone, etc.), and water; dispersible finely divided solid carriers, such as natural ground minerals (for instance, kaolins, alumina, silica, chalk, i.e., calcium carbonate, talc, kieselguhr, etc.), and synthetic ground minerals (for instance, highly dispersed silicic acid, silicates e.g., alkali silicates, etc.); emulsifying agents, such as non-ionic and anionic emulsifying agents (for instance, polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and dispersing agents, such as lignin, sulfite waste liquors, methyl cellulose, etc.

As will be appreciated by the artisan, the active compounds according to the instant invention may be present in such formulations or compositions in the form of mixtures with one another and with other known active substances, if desired.

The substances according to the invention may be employed by themselves as the artisan will appreciate, in the form of their compositions with solid or liquid dispersible carrier vehicles or other known compatible active agents, or in the form of particular dosage preparations for specific application made therefrom, such as solutions, emulsions, suspensions, powders, pastes and granulates, which are thus ready for use.

As concerns commercial preparations, these generally contemplate carrier composition mixtures in which the active compound is present in an amount substantially between about 0.1–95 percent by weight, and preferably 0.5–90 percent by weight of the mixture, whereas carrier composition mixtures suitable for direct application or field application generally contemplate those in which the active compound is present in an amount substantially between about 0.001 and 5 percent by weight of the mixture. Thus such mixtures over-all contemplate an amount of the active compound which is effective for the purpose in question and which is generally between about 0.001 and 95 percent by weight of the mixture. Thus, the instant formulations or compositions are applied in the usual manner, for example, by pouring, spraying, atomizing, vaporizing, smoking, i.e., fumigating, scattering, dusting, and the like.

The outstanding insecticidal and acaricidal effectiveness of the particular compounds according to the present invention, as well as their superiority to compounds of analogous constitution and similar action, such as those which are known from U.S. Pat. No. 3,019,250, may be appreciated from the following examples demonstrating such utility, which examples are given for the purpose of illustrating, while not limiting, the present invention.

EXAMPLE 1

Plutella Test
Solvent: three parts by weight acetone
Emulsifier: one part by weight alkyl aryl polyglycol ether For the preparation of a suitable active material preparation, one part by weight of the particular active material is mixed with the stated amount of solvent, which contains the stated amount of emulsifier, and the concentrate thereby formed is diluted with water to the desired concentration.

Cabbage leaves (*Brassica oleracea*) are sprayed with the particular active material preparation and infested with caterpillars of the cabbage butterfly (*Plutella maculipennis*).

After a given period of time, the degree of killing is determined percentagewise. 100 percent indicates that all of the caterpillars are killed, whereas 0 percent indicates that no caterpillars are killed.

The active materials, active material concentrations, evaluation time and results are given in the following Table 1:

TABLE 1.—(Plant-damaging insects)

| Active material (constitution) | | Active material concentration in percent | Degree of killing in percent after 4 days |
|---|---|---|---|
| (A) | 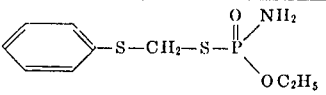 | 0.1<br>0.01<br>0.001 | 100<br>40<br>0 |
| | (Known from U.S. Patent No. 3,019,250, Example 2). | | |
| (B) | 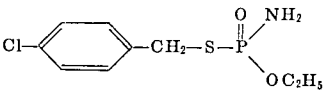 | 0.1<br>0.01 | 100<br>0 |
| | (Known from U.S. Patent No. 3,019,250, Example 3). | | |
| (III) | 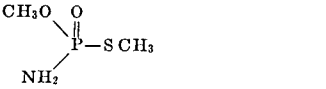 | 0.1<br>0.01<br>0.001 | 100<br>100<br>40 |
| | (According to the invention, Example 1). | | |
| (IV) | 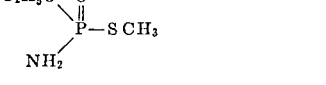 | 0.1<br>0.01<br>0.001 | 100<br>100<br>100 |
| | (According to the invention, Example 2). | | |
| (C) | 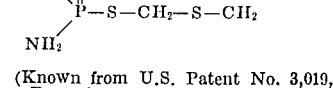 | 0.1<br>0.01 | 60<br>0 |
| | (Known from U.S. Patent No. 3,019,250, Example 20). | | |

It is seen from Table 1 that compounds III and IV of the present invention possess a 66⅔ percent better effect (i.e., total effectiveness) than the known compound C at 0.1 percent concentration, and while such effect of the instant compounds remains at 0.01 percent concentration, compound C has no effect at all at such lower concentration. As compared with the known compounds A and B, the instant compounds III and IV possess markedly better effect at the lower concentrations of 0.01 and 0.001 percent. It certainly must be considered surprising that the instant compounds having a thiolmethyl group are so much better in effectiveness at lower concentrations than the known analogous mercapto or aromatic substituted amido-phosphoric acid compounds. Advantageously, the instant compounds can be used in lower concentrations than heretofore, yet with extremely good effectiveness.

EXAMPLE 2

Myzus test (contact action)
Solvent: three parts by weight acetone
Emulsifier: one part by weight alkyl aryl polyglycol ether For the preparation of a suitable active material preparation, one part by weight of the particular active material is mixed with the stated amount of solvent, which contains the stated amount of emulsifier, and the concentrate thereby formed is diluted with water to the desired concentration.

Cabbage plants (*Brassica oleracea*), which are strongly infested with peach leaf lice (*Myzus persicae*), are sprayed drip wet with the particular active material preparation.

After a given period of time, the degree of killing is determined percentagewise. 100 percent indicates that all of the leaf lice are killed, while 0 percent indicates that no leaf lice are killed.

The active materials, active material concentrations, evaluation time and results are given in the following Table 2:

Here again, in Table 2 the instant compounds are shown to be significantly better than the known analogous compound B at lower concentrations, whereby it is clear that the present invention enables marked biocidal effectiveness to be achieved at lower concentrations of the active compound than heretofore.

EXAMPLE 3

Rhopalosiphum Test (systemic action)
Solvent: three parts by weight acetone
Emulsifier: one part by weight alkyl aryl polyglycol ether For the preparation of a suitable active material preparation, one part by weight of the particular active material is mixed with the stated amount of solvent, which contains the stated amount of emulsifier, and the concentrate thereby formed is diluted with water to the desired concentration.

Oat plants (*Avena sativa*), which are heavily infested with oat lice (*Rhopalosiphum padi*), have the particular active material preparation poured over them so that the active material preparation penetrates into the soil without wetting the leaves of the oat plants. The active material is taken up from the soil by the oat plants and thus reaches the attacked leaves.

After a given period of time, the degree of killing is determined percentagewise. 100 percent indicates that all of the leaf lice are killed, whereas 0 percent indicates that no leaf lice are killed.

The active materials, active material concentrations, evaluation time and results are given in the following Table 3:

TABLE 2.—(PLANT DAMAGING INSECTS)

| Active material (constitution) | | Active material concentration in percent | Degree of killing in percent after 24 hours |
|---|---|---|---|
| (B') | Cl—C$_6$H$_4$—CH$_2$—S—P(=O)(NH$_2$)(OC$_2$H$_5$) | 0.1 | 99 |
| | | 0.01 | 0 |
| | (Known from U.S. Patent No. 3,019,250, Example 3). | | |
| (III') | CH$_3$O—P(=O)(SCH$_3$)(NH$_2$) | 0.1 | 100 |
| | | 0.01 | 100 |
| | | 0.001 | 60 |
| | (According to the invention, Example 1). | | |
| (IV') | C$_2$H$_5$O—P(=O)(SCH$_3$)(NH$_2$) | 0.1 | 100 |
| | | 0.01 | 100 |
| | (According to the invention, Example 2). | | |

TABLE 3.—(PLANT DAMAGING INSECTS)

| Active material (constitution) | | Active material concentration in percent | Degree of killing in percent after 8 days |
|---|---|---|---|
| (A') | C$_6$H$_5$—S—CH$_2$—S—P(=O)(NH$_2$)(OC$_2$H$_5$) | 0.1 | 100 |
| | | 0.01 | 0 |
| | (Known from U.S. Patent No. 3,019,250, Example 2). | | |
| (B'') | Cl—C$_6$H$_4$—CH$_2$—S—P(=O)(NH$_2$)(OC$_2$H$_5$) | 0.1 | 20 |
| | (Known from U.S. Patent No. 3,019,250, Example 3). | | |
| (III'') | CH$_3$O—P(=O)(SCH$_3$)(NH$_2$) | 0.1 | 100 |
| | | 0.01 | 100 |
| | | 0.001 | 100 |
| | (According to the invention, Example 1). | | |

TABLE 3.—(PLANT DAMAGING INSECTS) —Continued

| Active material (constitution) | Active material concentration in percent | Degree of killing in percent after 8 days |
|---|---|---|
| (IV''') 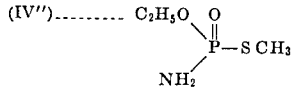 (According to the invention, Example 2) | 0.1<br>0.01<br>0.001 | 100<br>100<br>100 |

Table 3 clearly establishes the superb total effectiveness of the instant compounds, even at the extremely low concentration of 0.001 percent, whereas the known compounds only exhibit effectiveness at the comparatively high concentration of 0.1 percent but not at a lower concentration.

EXAMPLE 4

Tetranychus Test
Solvent: three parts by weight acetone
Emulsifier: one part by weight alkyl aryl polyglycol ether For the preparation of a suitable active material preparation, one part by weight of the particular active material is mixed with the stated amount of solvent, which contains the stated amount of emulsifier, and the concentrate thereby formed is diluted with water to the desired concentration.

Bean plants (*Phaseolus vulgaris*), which have a height of about 10–30 cm, are sprayed dripping wet with the particular active material preparation. These bean plants are heavily infested with all stages of development of the common spider mite (*Tetranychus urticae*).

After a stated period of time, the effectiveness of the particular active material preparation is determined by counting the dead pests. The degree of killing so obtained is determined percentagewise. 100 percent indicates that all of the spider mites are killed, whereas 0 percent indicates that no spider mites are killed.

The active materials, active material concentrations, evaluation time and results are given in the following Table 4:

Table 4 also demonstrates the marked superiority of the instant compounds as opposed to analogous known compounds, in consideration of the consistently high biocidal effect of the compounds of the invention at lower concentrations, when compared with the absence of any effect of the known compounds at such lower concentrations.

The following examples are given for the purpose of illustrating, while not limiting, the production process of the present invention:

Example 5

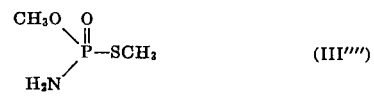

89.4 grams (0.6 mol) of the sodium salt of amido-O-methyl-thiolphosphoric acid are dissolved in 100 cc. water. Sixty-five grams (0.5 mol) dimethyl sulfate are added dropwise to this solution at 20° to 25° C, while stirring. After stirring for a half-hour at room temperature, the reaction mixture is treated with a solution of potassium carbonate until it becomes turbid and then repeatedly shaken out with methylene chloride. The methylene chloride solution is dried over anhydrous sodium sulfate and the solvent distilled off. The distillation residue solidifies in the form of crystals. It is recrystallized from 20 times its quantity of ether and amidothiolphosphoric acid-O,S-dimethyl-ester is obtained in the form of colorless, water-solu-

TABLE 4.—(PLANT-DAMAGING SPIDER MITES)

| Active material (constitution) | Active material concentration in percent | Degree of killing in percent after 8 days |
|---|---|---|
| (A'') 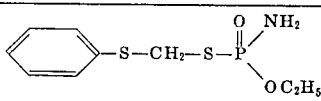 (Known from U.S. Patent No. 3,019,250, Example 2). | 0.1<br>0.01 | 100<br>0 |
| (B''') 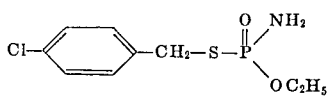 (Known from U.S. Patent No. 3,019,250, Example 3). | 0.1<br>0.01 | 100<br>0 |
| (III''') 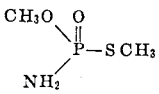 (According to the invention, Example 1). | 0.1<br>0.01 | 100<br>90 |
| (IV''') 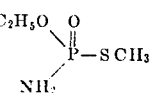 (According to the invention, Example 2). | 0.1<br>0.01 | 100<br>70 | ble, small needles of melting point 54° C. The yield is 54 g (76.5 percent of the theoretical).

Analysis:
Calculated for molecular weight 141.1:
N 9.93% S 22.73% P 21.95%
Found: N 9.69% S 22.59% P 21.61%

Caterpillars are completely destroyed by 0.01 percent solutions of the compound and 40 percent are destroyed even by 0.001 percent solutions; 0.01 percent solutions kill aphids completely and even 0.001 percent solutions kill 30 percent of the same pest.

EXAMPLE 6

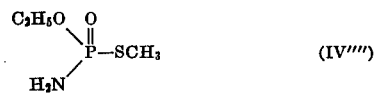 (IV'''')

Ninety grams (0.55 mol) of the sodium salt of amido-O-ethyl-thiolphosphoric acid are dissolved in 100 cc water. 65 g (0.5 mol) dimethyl sulfate are added dropwise to this solution at 20°to 30° C, with external cooling, and after stirring for a half-hour at room temperature, the reaction mixture is mixed with a potassium carbonate solution until cloudiness occurs. The aqueous solution is then shaken out four times with 100 cc methylene chloride each time, the organic phase dried over anhydrous sodium sulfate and the solvent finally distilled off. The distillation residue is suspended in ether, undissolved material is filtered off with suction, and amido-thiolphosphoric acid-O-ethyl-S-methyl ester is obtained in the form of colorless, water-soluble crystals of melting point 70° C. The yield is 59 g (76.1 percent of the theoretical). There is no change of the melting point of the compound after recrystallization from acetonitrile.

Analysis:
Calculated for molecular weight 155.3:
N 9.03% S 20.66% P 19.97%
Found: N 9.15% S 20.88% P 19.70%

Caterpillars and spider mites are completely killed by 0.001 percent solutions of the compound.

Example 7

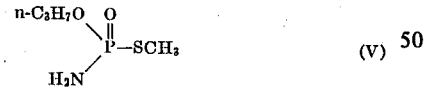 (V)

To a solution of 80 g (0.45 mol) of the sodium salt of amido-O-n-propylthiolphosphoric acid (m.p. 127° C) in 150 cc water, there are added dropwise at 25°to 30° C, with external cooling, 50 g (0.4 mol) dimethyl sulfate. The mixture is stirred for a half-hour at room temperature, and the reaction product is then salted out with a potassium carbonate solution and worked up in the manner described in the preceding examples. Forty-six grams (69.2 percent of the theoretical) of amido-thiolphosphoric acid-O-n-propyl-S-methyl ester are obtained in the form of a light yellow, somewhat viscous oil, which solidifies upon cooling in ice and again liquefies at room temperature.

Analysis:
Calculated for molecular weight 169.1:
N 8.28% S 19.96% P 18.32%
Found: N 8.24% S 19.02% P 18.41%

Example 8

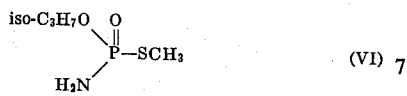 (VI)

One-hundred six grams (0.6 mol) of the sodium salt of amido-O-isopropyl-thiolphosphoric acid (m.p. 173° C) are dissolved in 130 cc water. This solution is mixed dropwise at 25°to 30° C, while cooling, with 65 g (0.5 mol) dimethyl sulfate and, after stirring the mixture for a half-hour, the reaction product is salted out with a saturated potassium carbonate solution. It is extracted from the aqueous solution by repeated shaking with methylene chloride. Finally, the organic layer is dried over anhydrous sodium sulfate and the solvent distilled off. The residue solidifies; it is suspended in ether and filtered off with suction. Amido-thiolphosphoric acid-O-isopropyl-S-methyl ester is obtained as a colorless crystalline powder of melting point 68°–70° C. The yield is 47 g (55 percent of the theoretical).

Analysis:
Calculated for molecular weight 169.1:
N 8.28% S 18.96% P 18.32%
Found: N 8.33% S 19.42% P 18.16%

Example 9

Upon repeating the procedure of Example 4, using corresponding molar amounts of the sodium salts of amido-O-n-butyl-thiolphosphoric acid, amido-O-iso-butyl-thiolphosphoric acid, amido-O-sec.-butyl-thiolphosphoric acid, amido-O-tert.-butyl-thiolphosphoric acid, amido-O-n-phenyl-thiolphosphoic acid, amido-O-n-octyl-thiolphosphoric acid, and amido-O-n-dodecyl-thiolphosphoric acid, as the case may be, the following products, respectively, will be obtained, each of which will possess the desired biocidal, especially insecticidal and acaricidal, properties, as well as a low degree of mammalian toxicity and a low degree of phytotoxicity: amido-thiolphosphoric acid-O-n-butyl-S-methyl ester, amido-thiolphosphoric acid-O-isobutyl-S-methyl ester, amido-thiolphosphoric acid-O-sec.-butyl-S-methyl ester, amido-thiolphosphoric acid-O-tert.-butyl-S-methyl ester, amido-thiolphosphoric acid-O-n-octyl-S-methyl ester, amidothiolphosphoric acid-O-n-octyl-S-methyl ester, and amido-thiolphosphoric acid-O-n-dodecyl-S-methyl ester.

Accordingly, the present invention contemplates the production of particular, new amido-thiolphosphoric acid esters having general formula I above, by reacting an amido-O-alkyl-thiophosphoric acid salt of general formula II above with a methylating agent, whereby the corresponding amido-thiolphosphoric acid is produced, and especially one having the formula

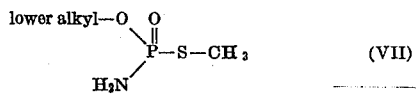 (VII)

Biocidal, such as pesticidal, and especially insecticidal and acaricidal, compositions are also contemplated in accordance with the present invention which include a mixture of a dispersible carrier vehicle of the foregoing type, and a biocidally effective amount of an amido-thiolphosphoric acid ester of the foregoing type.

Furthermore, methods of using the instant compounds are also contemplated, including especially a method of combating pests, such as insects and/or acarids, by applying to such pests, and especially insects and/or acarids, and their habitat a biocidally, especially pesticidally, effective amount of the compounds of the instant type either alone or in admixture with a dispersible carrier vehicle of the foregoing type in the well known field application or direct application proportions.

The foregoing amido-thiolphosphoric acid esters of the present invention indeed possess a higher degree of potency and activity than presently known analogous biocidal compounds, especially as regards pesticidal, and in particular insecticidal and acaricidal, activity. Because of the high potency even at comparatively low concentrations, the instant compounds may be employed more economically with ease in manipulation and use in the field. Because of the distinctly low toxicity toward warm-blooded animals and the distinctly low phytotoxicity of these compounds, such compounds are especially useful in crop control techniques in ridding plant crops of sucking and eating insects. Because of their singular properties, the instant compounds have very good contact-insecticidal activity as well as excellent systemic action, which renders the same useful as hygiene control agents, in particular crop control agents.

It will be appreciated that the instant specification and examples are set forth by way of illustration and not limitation, and that various modifications and changes may be made without departing from the spirit and scope of the present invention which is to be limited only by the scope of the appended claims.

What is claimed is:

1. An insecticidal or acaricidal composition which comprises a mixture of a carrier vehicle and an insecticidally or acaricidally effective amount of an amido-thiophosphoric acid ester having the formula

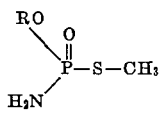

in which R is a member selected from the group consisting of linear and branched alkyl radicals of 1-12 carbons.

2. A composition according to claim 1 wherein said acid ester is present in an amount substantially between about 0.001 and 95 percent by weight of the mixture, and said carrier vehicle is selected from the group consisting of a dispersible carrier liquid and a dispersible carrier solid.

3. An insecticidal or acaricidal composition according to claim 1 which comprises a mixture of a dispersible carrier vehicle and an insecticidally or acaricidally effective amount, substantially between about 0.001 and 95 percent by weight of the mixture, of an amido-thiolphosphoric acid ester having the formula

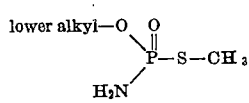

4. An insecticidal or acaricidal composition according to claim 1 which comprises a mixture of a dispersible carrier vehicle and an insecticidally or acaricidally effective amount, substantially between about 0.001 and 95 percent by weight of the mixture, of amido-thiolphosphoric acid-O,S-dimethyl ester having the formula

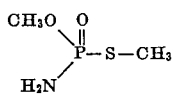

5. An insecticidal or acaricidal composition according to claim 1 which comprises a mixture of a dispersible carrier vehicle and an insecticidally or acaricidally effective amount, substantially between about 0.001 and 95 percent by weight of the mixture, of amido-thiolphosphoric acid-O-ethyl-S-methyl ester having the formula

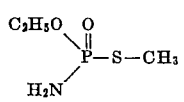

6. An insecticidal or acaricidal composition according to claim 1 which comprises a mixture of a dispersible carrier vehicle and an insecticidally or acaricidally effective amount, substantially between about 0.001 and 95 percent by weight of the mixture, of amido-thiolphosphoric acid-O-n-propyl-S-methyl ester having the formula

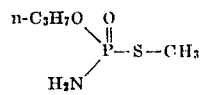

7. An insecticidal or acaricidal composition according to claim 1 which comprises a mixture of a dispersible carrier vehicle and an insecticidally or acaricidally effective amount, substantially between about 0.001 and 95 percent by weight of the mixture, of amido-thiolphosphoric acid-O-isopropyl-S-methyl ester having the formula

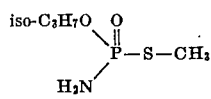

8. An insecticidal composition comprising a toxic amount of a compound of the formula

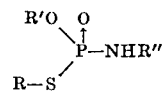

wherein R and R' are alkyl of from one to six carbons and R'' is selected from the group consisting of hydrogen and alkyl of from one to four carbons and an inert carrier therefor.

9. The composition of claim 8 wherein R'' is hydrogen.

10. The composition of claim 9 wherein R and R' are methyl.

11. An insecticidal composition comprising a toxic amount of a compound of the formula

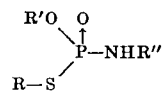

wherein R is methyl and R' is alkyl of from one to five carbons and R'' is hydrogen and an inert carrier therefor.

12. A method of combating pests selected from the group consisting of insects and acarids which comprises applying to such pests or their habitat an insecticidally or acaricidally effective amount of an amido-thiolphosphoric acid ester having the formula

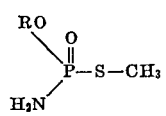

in which R is a member selected from the group consisting of linear and branched alkyl radicals of 1-12 carbons.

13. The method of combating pests according to claim 12 which comprises applying to such pests or their habitat an insecticidally or acaricidally effective amount of amido-thiolphosphoric acid-O,S-dimethyl ester having the formula

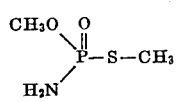

14. The method of combating pests according to claim 12 which comprises applying to such pests or their habitat an insecticidally or acaricidally effective amount of amido-thiolphosphoric acid-O-ethyl-S-methyl ester having the formula

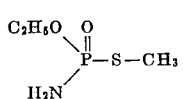

15. The method of combating pests according to claim 12 which comprises applying to such pests or their habitat an insecticidally or acaricidally effective amount of amidothiolphosphoric acid-O-n-propyl-S-methyl ester having the formula

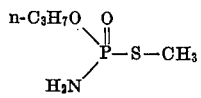

16. The method of combating pests according to claim 12 which comprises applying to such pests or their habitat an insecticidally or acaricidally effective amount of amidothiolphosphoric acid-O-isopropyl-S-methyl ester having the formula

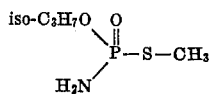

17. The method of combating pests according to claim 12 which comprises applying to such pests or their habitat a mixture of a dispersible carrier vehicle and an insecticidally or acaricidally effective amount, substantially between about 0.001 and 95 percent by weight of the mixture, of an amidothiolphosphoric acid ester having the formula

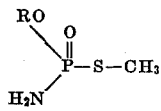

in which R is a member selected from the group consisting of linear and branched alkyl radicals of 1–12 carbon atoms.

18. The method of combating pests according to claim 12 which comprises applying to such pests or their habitat a mixture of a dispersible carrier vehicle and an insecticidally or arcaricidally effective amount, substantially between about 0.001 and 95 percent by weight of the mixture, of an amidothiolphosphoric acid ester having the formula

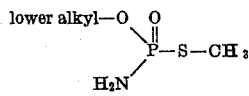

19. The method of combating pests according to claim 12 which comprises applying to such pests or their habitat a mixture of a dispersible carrier vehicle and an insecticidally or acaricidally effective amount, substantially between about 0.001 and 95 percent by weight of the mixture, of amidothiolphosphoric acid-O,S-dimethyl ester having the formula

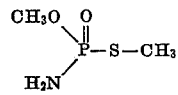

20. The method of combating pests according to claim 12 which comprises applying to such pests or their habitat a mixture of a dispersible carrier vehicle and an insecticidally or acaricidally effective amount, substantially between about 0.001 and 95 percent by weight of the mixture, of amidothiolphosphoric acid-O-ethyl-S-methyl ester having the formula

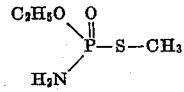

21. The method of combating pests according to claim 12 which comprises applying to such pests or their habitat a mixture of a dispersible carrier vehicle and an insecticidally or acaricidally effective amount, substantially between about 0.001 and 95 percent by weight of the mixture, of amidothiolphosphoric acid-O-n-propyl-S-methyl ester having the formula

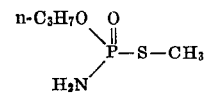

22. The method of combating pests according to claim 12 which comprises applying to such pests or their habitat a mixture of a dispersible carrier vehicle and an insecticidally or acaricidally effective amount, substantially between about 0.001 and 95 percent by weight of the mixture, of amidothiolphosphoric acid-O-isopropyl-S-methyl ester having the formula

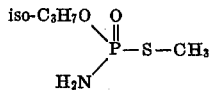

23. A method for killing insects which comprises applying to the immediate environment of a host plant subject to attack by said insects a toxic amount of a compound of the formula

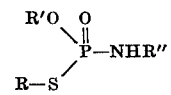

wherein R and R' are alkyl of from 1 to 6 carbons and R'' is selected from the group consisting of hydrogen and alkyl of from one to four carbons.

24. The method of claim 23 wherein R'' is hydrogen.
25. The method of claim 24 wherein R and R' are methyl.
26. A method for killing insects which comprises contacting said insects with a toxic amount of a compound of the formula

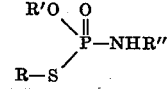

wherein R and R' are alkyl of from one to six carbons and R'' is selected from the group consisting of hydrogen and alkyl of from one to four carbons.

27. The method of claim 26 wherein R'' is hydrogen.
28. The method of claim 27 wherein R and R' are methyl.
29. A method for killing insects which comprises applying to the immediate environment of a host plant subject to attack by said insects a toxic amount of a compound of the formula

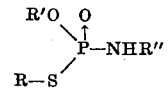

wherein R is methyl and R' is alkyl of from one to five carbons and R'' is hydrogen.

30. A method for killing insects which comprises contacting said insects with a toxic amount of a compound of the formula

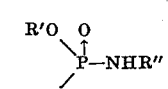

wherein R is methyl and R' is alkyl of from one to five carbons and R'' is hydrogen.

* * * * *